Figure 8:
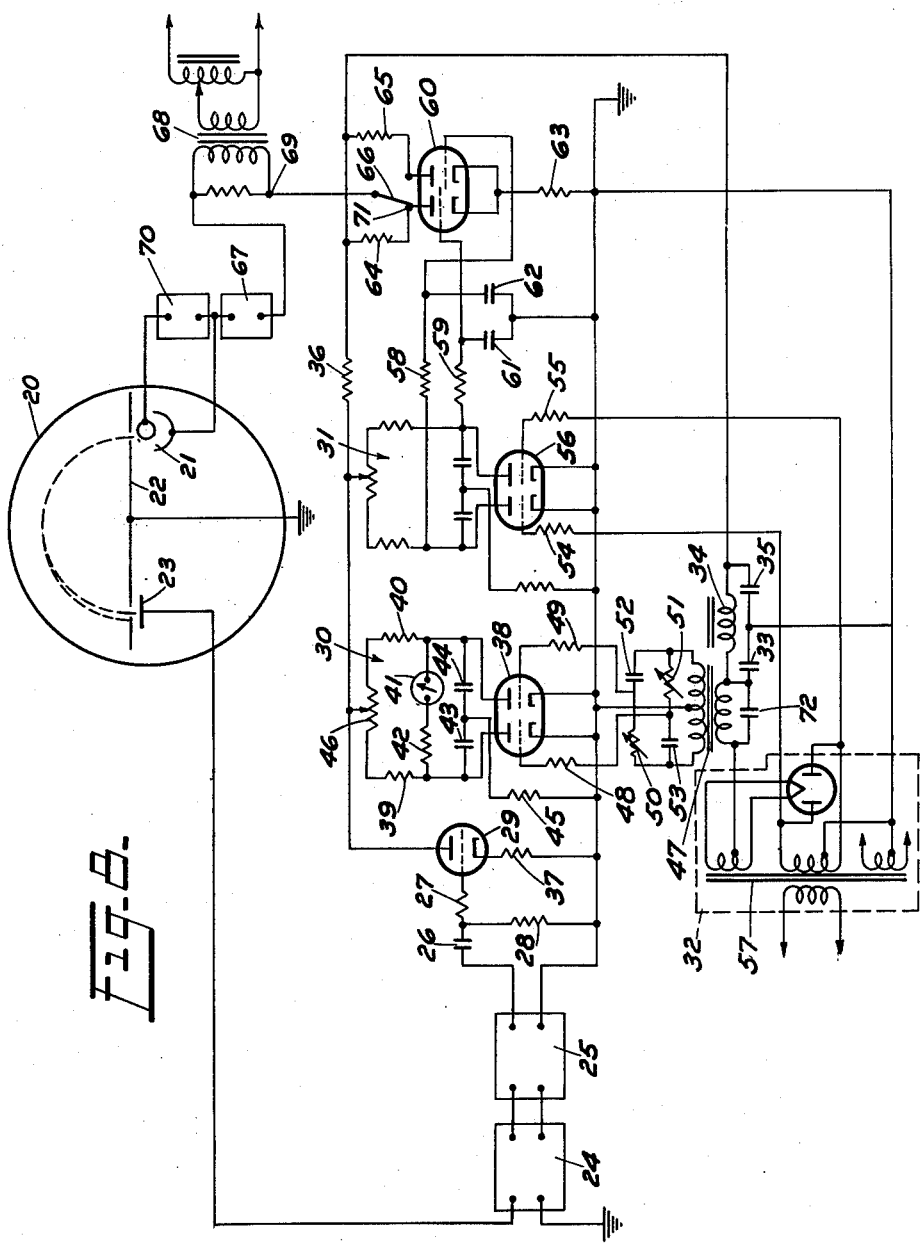

Sept. 25, 1951     R. DE LIBAN     2,569,232
FILTER
Filed Feb. 15, 1950     4 Sheets-Sheet 1
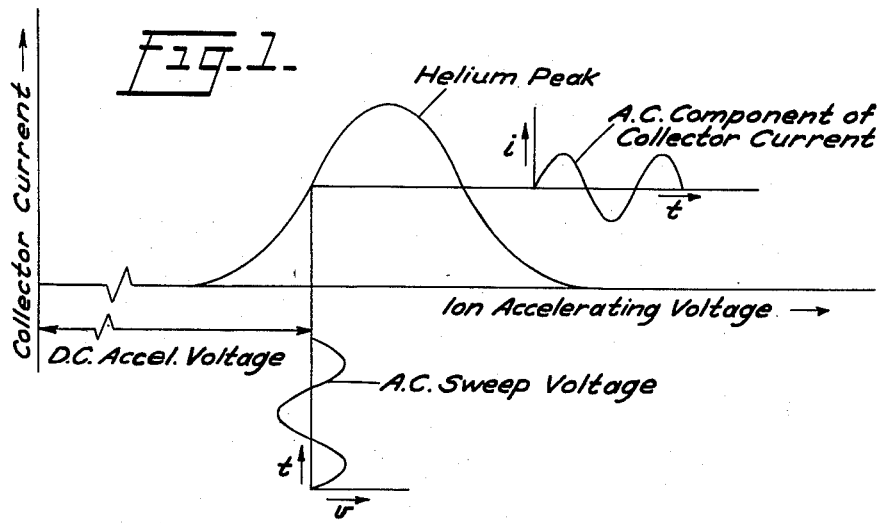
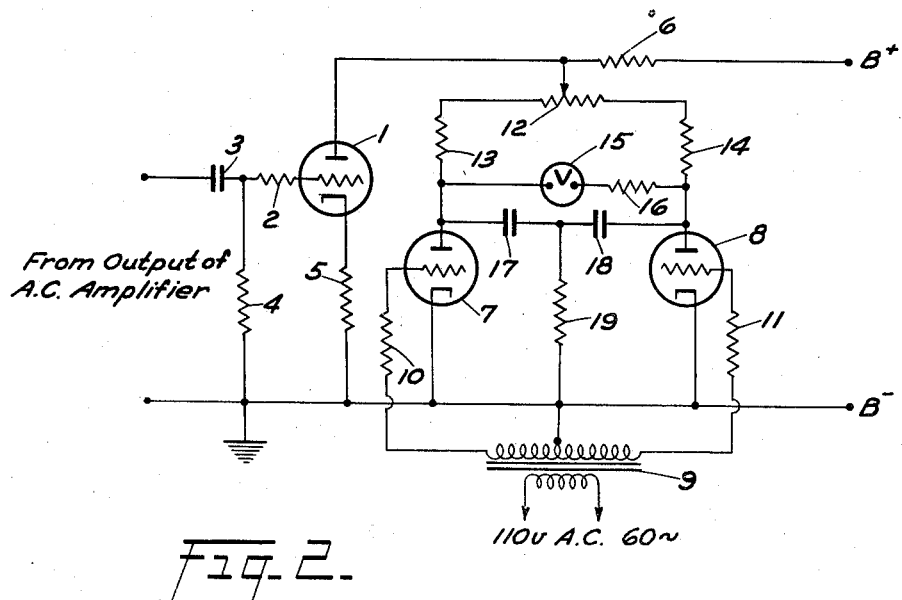
INVENTOR.
Robert DeLiban
BY
ATTORNEY

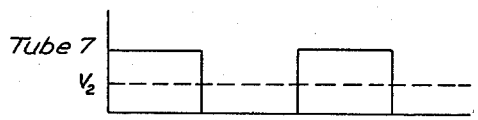
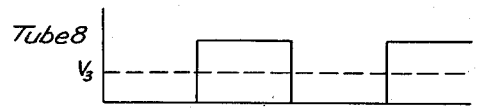
Fig. 3.
Fig. 4.
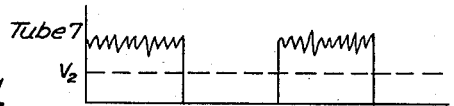
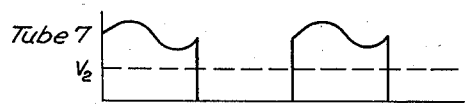
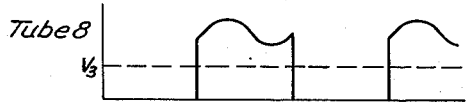
Fig. 5.
Fig. 6.
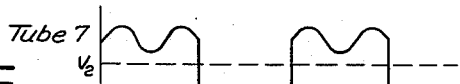
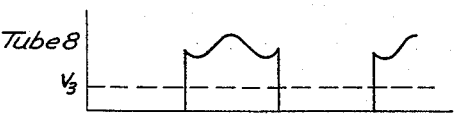
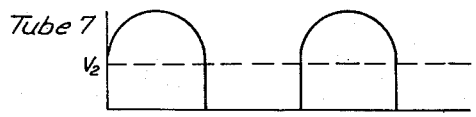
Fig. 7.
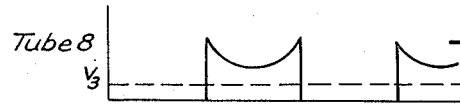
INVENTOR.
Robert DeLiban
BY
Roland A. Anderson
ATTORNEY

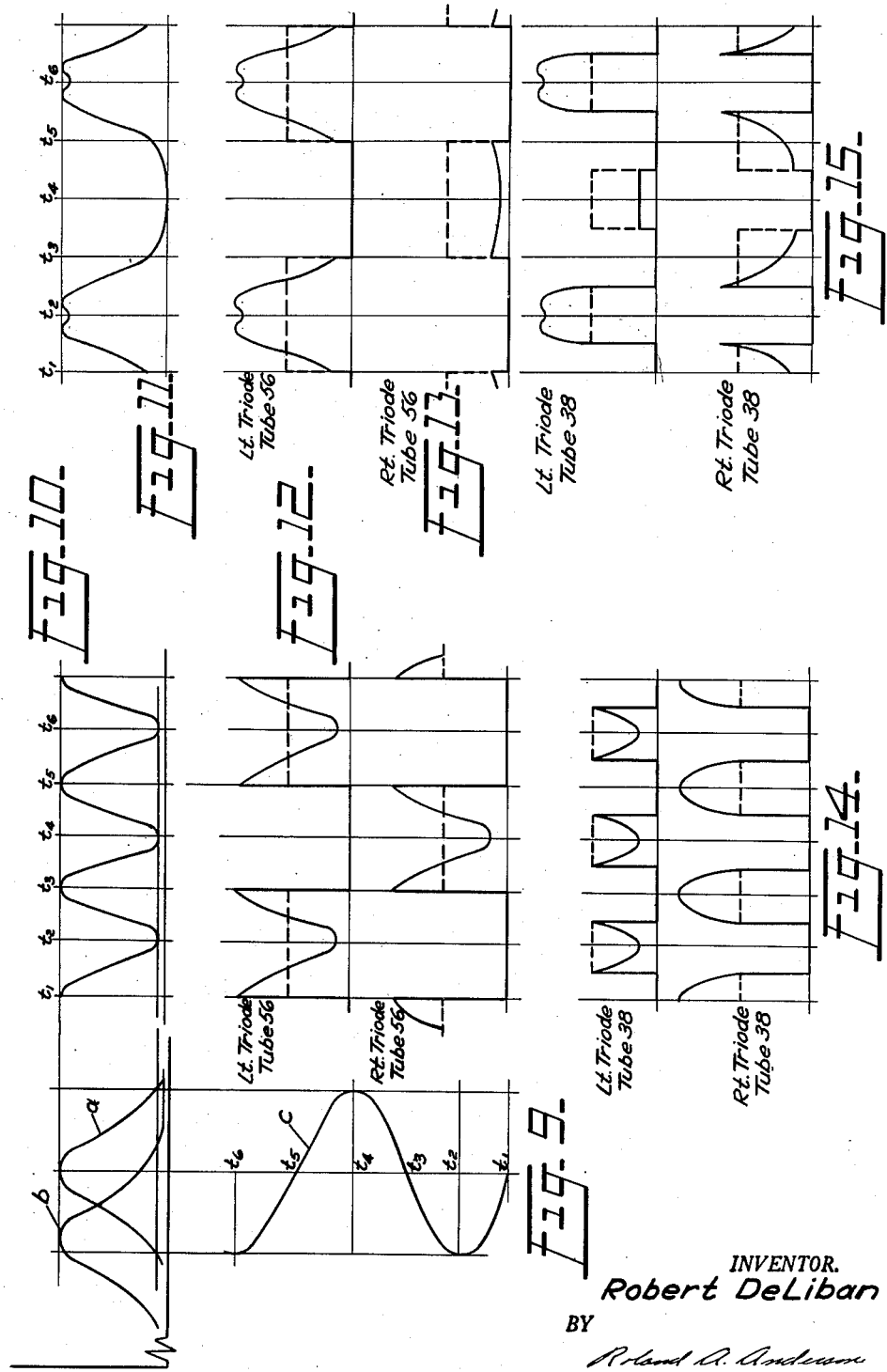

Patented Sept. 25, 1951

2,569,232

UNITED STATES PATENT OFFICE 2,569,232

FILTER

Robert De Liban, Menlo Park, Calif., assignor to the United States of America as represented by the United States Atomic Energy Commission Application February 15, 1950, Serial No. 144,369

6 Claims. (Cl. 250—41.9)

My invention relates to filter circuits and/or systems and more particularly to a synchronous system or rectifier circuit which may be used in an automatic stabilizing arrangement, such as an arrangement for maintaining the accelerating voltage or other applied potential of a leak detector or mass spectrometer substantially constant, and which may have a wide variety of other applications.

The art of filters and filter circuits is an old one, but the need for an adequate filter arrangement, particularly of the synchronous type is manifest in many fields including those of leak detection and mass spectrometry. Here the effects of varying electrode potentials alter the degree of accuracy and dependability of such high precision equipments over periods of continuous or intermittent operation. These changes in potential may result from low or high frequency noise currents in the power supply system, from inadequate regulation of the power supply voltage, or from other causes. In leak detection where a gas such as helium, is employed, it may become especially important to maintain the accelerating voltages substantially constant, since they, in effect, maintain the helium beam on the collector plate of the equipment and in proper alignment with the defining slots. This is especially true where an A. C. potential is superimposed upon the accelerating potential to facilitate simplification of the amplifying circuits utilizing A. C. amplification for the signal at the collector plate. Variations in the magnitude of the electrode voltages can serve to alter the beam position with respect to the collector, and this may effect the accuracy and fidelity of the results. In addition, where the desired or selected frequency of alternating current may be changed from time to time and where the requirements are such that suppression of all other frequencies is desired, it becomes expensive and requires considerable time to completely redesign or replace the filters each time so that the newly selected frequency may be employed or extracted. Also, in the absence of any adequate stabilizing arrangement, the operator must adjust the unit to maximize the signal in response to such changing conditions.

Applicant with a knowledge of all of these problems in the prior art has for an object of his invention the provision of a filter circuit which may be synchronized to pass any one of a plurality of frequencies.

Applicant has as another object of his invention the provision of a synchronous filter circuit which may be employed in an automatic stabilizing arrangement for extracting a selected signal or frequency from a general background of signals and noise to provide a high signal to noise ratio and to establish higher available sensitivity.

Applicant has as another object of his invention the provision of a filter having a constant phase relationship between a selected signal and the synchronous signal to facilitate detection of the selected signal when in the presence of an undesired signal or signals, only a few cycles removed in frequency.

Applicant has as a further object of his invention, the provision of a synchronous filter circuit for incorporation into a leak detector system to provide an automatic stabilizing arrangement therefor and eliminate the necessity for manual adjustment of the unit by the operator to maximize the signal as various conditions change during operation.

Applicant has as a still further object of his invention, the provision of a metering circuit having symmetrical noise limiting and at such an amplitude as will minimize meter fluctuations.

Other objects and advantages of my invention will appear from the following specification and the accompanying drawings, and the novel features thereof will be particularly pointed out in the annexed claims.

In the drawings, Fig. 1 is a graph of collector current plotted against accelerating potential showing a 60 cycle A. C. sweep voltage superimposed on the helium ion accelerating potential. Fig. 2 is a schematic of my improved synchronous filter or rectifier circuit. Fig. 3 is a graph of plate current against time for the two electric discharge devices of my improved filter when there is no impressed signal. Fig. 4 is a similar graph with high frequency noise impressed upon the plates of the discharge device. Fig. 5 is a similar graph with 120 cycles impressed upon the plates of the discharge devices. Fig. 6 is a similar graph with 180 cycles impressed upon the plates of the electric discharge devices. Fig. 7 is a similar graph with a 60 cycle signal impressed upon the plates of the electric discharge devices. Fig. 8 is a schematic of a helium leak detector arrangement incorporating my improved filter system for stabilizing the D. C. accelerating potential thereof. Fig. 9 is a graph showing the relation of a 60 cycle A. C. wave when the D. C. accelerating potential is adjusted to the peak of the helium beam, that is when maximized, and also when not adjusted to the peak of the helium beam, that is, when not maximized. Fig. 10 is a graph of total collector current when the accelerating potential is adjusted to the helium peak to provide a 120 cycle metering signal. Fig. 11 is a graph of the total collector current when the D. C. accelerating potential has deviated from the helium peak to provide 120 and 60 cycle components. Fig. 12 is a graph showing the effect of the imposition of the 120 cycle signal of Fig. 10 upon the plates of a 60 cycle filter. Fig. 13 is a graph showing the effect of imposing the 120 and 60 cycle components upon the plates of the tubes of the same filter. Fig. 14 is a graph showing the effect of imposing the 120 cycle signal upon the plates of a 120 cycle filter. Fig. 15 is a graph showing the effect of imposing the 120 and 60 cycle components upon the plates of the tube of the latter filter.

The automatic stabilizing arrangement incorporating the synchronous filter system described in detail hereinafter, is of general application rather than being limited to the functions of a filter alone, that is, it is applicable to the regulation of any independent variable quantity that may be measured by a dependent variable, even though the functions relating the two variables has a derivative of changing sign at the desired value of the independent variable. Thus, the system allows regulation of quantities that could not otherwise be regulated, since, the usual requirement no longer holds, i. e., that a dependent variable be available for measurement whose magnitude varies in opposite directions if the magnitude of the independent variable varies in opposite directions from the desired point, so that the sign of the deviation can be distinguished. For example, suppose an independent variable X is to be regulated and can only be measured by quantity Y that is some function of X whose derivative is always of the same sign. It is then theoretically possible to regulate X at any value say X' by using conventional feedback techniques. However, if this function relating the variables has a derivative of changing sign at the value of X desired, say X', it is not possible to regulate X in the usual manner, since at X', a deviation either way gives an error signal of the same sign in the variable Y so that the regulating circuit can not distinguish in which direction to correct. On the other hand, if a very small modulation of the X variable can be tolerated, then it is possible to regulate at X' by the invention disclosed herein. In other words, a sine (or any symmetrical) wave may be superimposed on the X variable and a synchronized filter circuit can be utilized to extract the desired correcting signal from the dependent Y variable. It is apparent that this correcting signal will then change in opposite directions for opposite deviations in variable X from the desired point X', and may be used to regulate the variable X to the desired value X', since the derivative of this signal is now of constant sign.

It should be pointed out that in the above field of application, the superimposed modulation of the X variable is deliberately made as small as possible, the minimum useable amplitude being a function of the shape of the peak or trough in the X—Y function and the degree of regulation desired. For instance, with a flat top peak the modulating signal can not be decreased below a peak to peak swing equal to the limit of the flat top without decreasing the closeness of regulation obtainable. It is noted that under these conditions there would be no double frequency components available in the Y variable. However, if it is desired to monitor the magnitude of the X variable, and if a larger swing can be tolerated, it is then possible to obtain a double frequency component by merely increasing the modulation amplitude, in which case a double frequency metering circuit may be used in the manner described herein.

Referring now to the drawings in detail, and particularly to Fig. 2 wherein the preferred circuit of my improved filter is shown, 1 designates an electric discharge device, preferably of triode type, which is adapted to be coupled to the output of an A. C. amplifier (not shown) through conventional capacitance-resistance coupling. This coupling includes resistor 2 connected to the control grid of the discharge device 1, blocking condenser 3 for keeping the D. C. plate potential of the preceding A. C. amplifier from being impressed upon the grid of tube 1, and a resistor 4 bridged between the grid and ground. In addition, resistor 5 interposed in the cathode circuit of tube 1 between the cathode and ground, serves to provide a biasing potential for the tube. B (+) is applied to the plate of tube 1 through the load resistor 6.

The components of the filter include electric discharge devices 7, 8 which are preferably of triode type, and which have their control grids fed from the extremities of the secondary winding of power transformer 9 whose center tap is grounded. Interposed in the circuits leading to the control grids of tubes 7 and 8 are resistors 10, 11 which limit the flow of current through the grid circuits during the intervals when the control grids are positive. The plates of tubes 7 and 8 are fed from B (+) through load resistor 6 and are coupled to the output circuit of tube 1 by the balancing potentiometer 12 and resistors 13, 14. These latter resistors, together with tubes 7 and 8 complete a bridge circuit for meter 15 through resistor 16. Electrolytic type condensers 17, 18 bridge the plates of tubes 7 and 8 in series, with their common connecting lead grounded through resistor 19 to provide a negative polarizing voltage. Electrolytic type condensers were utilized in order to provide high capacity while preserving compactness. However, the circuit operation would not be adversely affected by the substitution of a single non-electrolytic type capacitor connected between the anodes of these tubes instead of the electrolytic condensers disclosed herein.

In operation, the signal from the A. C. amplifier (not shown) is impressed upon the input of tube 1 which amplifies it, and the voltage appearing at the plate thereof is in turn applied to the plates of tubes 7 and 8 through the coupling arrangement described heretofore. The output of tube 1 may contain a number of different frequencies, and the filter circuit described herein is operable to filter out the desired or selected frequency therefrom. The transformer 9 may be connected to a 110 volt power source, such as the supply for providing the sweep voltage for the ion source of a leak detector, so that with the center tap of the secondary, preferably of 480 volts, grounded, tubes 7 and 8 are acted upon through their control grids and are alternately driven to grid cutoff and plate saturation. With the frequency and phase of the voltage source for transformer 9 the same as the desired or selected frequency to be passed by the filter, the graph of Fig. 7 shows the resultant plate current of tubes 7 and 8 plotted against time. The polarity of the grid signal is such that the grid of tube 7 is positive when the plate potential of tubes 7 and 8 is a maximum, and the grid of tube 8 is positive when the plate potential of tubes 7 and 8 is a minimum. In this operation it may be noted that for the selected frequency the plate current is additive in tube 7 and subtractive in tube 8. This produces a high average of plate current for tube 7 and a low average of plate current for tube 8. For the converse case wherein the polarity of the grid signal is reversed with respect to the desired frequency, a higher average plate current is produced for tube 8 and a lower average plate current for tube 7. For noise currents, as will be seen in Fig. 4, the average balances out in the two tubes. For frequencies which do not conform to the selected frequencies, it will be seen in Figures 4, 5 and 6 that the average in tubes 7 and 8 are substantially equal and balance out, although Fig. 6 indicates a slight but immaterial increase in average current. The same is true when no signal is impressed upon the filter, as shown by the graph of Fig. 3.

As generally indicated heretofore, voltmeter 15 is connected in parallel with the damping or smoothing condensers 17, 18 through series resistor 16, which may be the resistance of the meter itself. This arrangement bridging the plates of tubes 7 and 8, indicates the difference in voltage drops across resistors 13, 14 resulting from the flow of currents across tubes 7 and 8 and through their plate circuits, and it will be understood that these are D. C. potentials. The damping effect is made as great as practicable without excessively slowing down or adversely affecting the meter response, to provide the longest possible averaging time for the meter circuit and thus permit discrimination against noise components of very low frequency.

The primary function of tube 1 is to amplify the input signal from the A. C. amplifier in a manner that will provide symmetrical limiting of high amplitude noise signals at a point just above full scale deflection of the meter 15. This reduces to a minimum the effect of high amplitude noise upon the meter reading. In addition, tube 1 has a limiting action on any signals of large magnitude, thereby protecting the circuit from overloads.

The potentiometer 12 serves to balance the meter 15 to read zero when there is no input signal in the circuit. Thus it will be seen from the foregoing that this filter circuit substantially eliminates random noise voltages and even harmonic voltages, and further, attenuates all odd harmonic voltages, passing the desired or selected frequency for use even in the presence of a reasonably low signal to noise ratio.

Now this circuit may have many applications, and representative of these applications is the instance where it serves as a stabilizer for a leak detector for a mass spectrometer system. In Fig. 8 the leak detector in schematic form is generally designated 20. While any appropriate or suitable type of leak detector or mass spectrometer may be incorporated in the system, one form of leak detector which has proved to be satisfactory for the purpose is disclosed in the copending application of Robert Loevinger, et al., Serial No. 706,842. The leak detector 20 preferably includes an ion source 21 either of the heated or cold cathode type for converting the molecules of a gas, preferably helium, into ions by bombardment in an ionizing chamber. The ions in leaving the source are acted upon by an electrical potential set up on an accelerating electrode 22 causing them to move at increased velocity. The moving ions are then acted upon the usual magnetic field (not shown) positioned at right angles to the plane of the figure. This causes the ions to proceed in arcuate paths whose radii correspond to their respective masses. At the focus of the beam of these ions or at some other appropriate point, the desired beam is made to pass through a defining slit and strike a collector 23. The charge or current at the collector plate is then amplified and measured and serves as an indication of the relative abundance of the ions. In the use of this device, D. C. accelerating potentials have been customarily employed but this practice results in a D. C. potential at the collector 23. This necessitates the use of D. C. amplifiers for amplifying the signal at the collector plate 23, but D. C. amplification is both complicated and cumbersome. To obviate the necessity for employing such equipment and to greatly simplify the problem involved, while securing the advantages of the more simplified A. C. amplification, it was decided to superimpose an A. C. voltage on the D. C. accelerating potential of the leak detector so that the voltage at the collector plate might have an A. C. component permitting A. C. amplification. The collector 23 is now coupled to a preamplifier 24 and this feeds into a main A. C. amplifier 25, but both of these components are of conventional construction. The output of amplifier 25 is then coupled through the usual capacitance coupling, heretofore described in connection with Fig. 2, and including condenser 26 and resistors 27, 28 to the input circuit of amplifier or limiter tube 29. The plate or output circuit of tube 29 is then coupled to two filter circuits generally designated 30 and 31. B (+) is applied to the plate of tube 29 from the conventional transformer power supply generally designated 32, through the conventional inductance-capacitance filters 34, and 33, 35, as well as the load resistor 36. Biasing is provided for the tube by the cathode resistor 37.

The filter circuit may be synchronized to the 120 cycle frequency and is similar to the circuit described in connection with Fig. 2. It preferably includes double triode 38 incorporated into a bridge with resistors 39, 40 and is associated with meter 41 connected through series resistor 42 and across electrolytic condensers 43, 44 which are grounded through resistor 45. The bridge is coupled to the output circuit of tube 29 by potentiometer 46. The grids of the two parts of tube 38 are fed from the transformer 47 in the output circuit of the power supply 32 through resistors 48, 49 which act to limit the flow of current in their respective circuits when the grids are positive, and keep the grid potential at substantially zero voltage by providing a high impedance source of grid voltage. The center tap of the secondary of transformer 47 is grounded as in the illustrative circuit of Fig. 2. A filter or phasing network including variable resistors 50 and 51 and condensers 52 and 53 may be tuned or adjusted to bring the 120 volt cycle ripple of the power source 32 into proper phase relation with the 120 cycle helium peak signal and to synchronize the filter. The condenser 72, bridged across the primary of transformer 47, serves to attenuate the undesirable high frequencies.

Filter 31 is in most respects similar to filter 30 and to the filter circuit of Fig. 2, except that discharge device 56, preferably of the double triode type, is coupled to a secondary winding of power transformer 57 in power source 32 through the grid resistors 54, 55. With the 60 cycle 110 volt power impressed upon the primary of transformer 57, the secondary winding coupled through the grid resistor to tube 56 delivers 60 cycle A. C. to its grids. The output circuits of tube 56 are not bridged by the usual meter but are connected through resistors 58, 59 to the control grids of discharge devices 60, preferably of double triode type. In addition, these grids are bridged by condensers 61, 62 connected in series, with their common connecting lead grounded. The cathodes of double triodes 60 are joined and grounded through a cathode resistor 63. B (+) potential is applied to the plates thereof through load resistors 64, 65 and the output circuits may be connected to the plate of either triode of tube 60 by selector switch 66.

The D. C. accelerating potential for the leak detector is supplied by the source 67, which may be of any suitable conventional form, and the A. C. components, of preferably 60 cycle frequency, are supplied by transformer 68 through the D. C. source 67. The positive side of the D. C. source 67 is connected to the ion source and the circuit is completed through ground from point 69 of the secondary of transformer 68 to the selector switch 66 and through one of the discharge devices 60 to ground via its cathodes which are tied together and grounded through a common cathode resistor 63. Similarly the accelerating electrode 22 is grounded. Potential for ion source 21 is supplied by a conventional E. M. F. source 70 which impresses a positive potential on the outer or anode portion and a negative potential on the inner or cathode portion. The selector switch 66, referred to above, merely provides a conventional means for selecting the proper polarity of output signal in the event that the A. C. phasing has been incorrectly carried out in the construction of the unit.

In the operation of this system the D. C. accelerating potential of source 67 is adjusted to coincide with the helium beam of the leak detector 20, that is, it is adjusted to focus the helium beam on the center of the collector slit so that the current at collector 23 is a maximum, as indicated by curve $a$ of Fig. 9. With the 60 cycle A. C., indicated by the lower curve $c$ of Fig. 9, superimposed upon the D. C. accelerating potential of source 67 by transformer 68, the input to the preamplifier 24 is essentially a 120 cycle signal instead of the 60 cycle voltage superimposed upon the D. C. accelerating potential. This becomes clear when points $t_1$, $t_2$, $t_3$, etc. of the 60 cycle wave $c$ of Fig. 9 are projected upward to intercept the maximized helium peak curve $a$ of that figure, and are then projected over or across to Fig. 10 to intercept the vertical lines representing corresponding time intervals. The resulting graph of Fig. 10 is substantially a sine wave of 120 cycle frequency.

To conform the system with this new signal the grids of tube 38 of filter 30 are, as heretofore indicated, now fed with the 120 cycle ripple frequency from the power supply by transformer 47. The filter circuit, synchronized to the 120 cycle frequency, operates as before so that there is a maximum current difference in the two halves of the tube 38, as indicated in Fig. 14, when the D. C. accelerating voltage coincides with the helium peak, and the resultant is a 120 cycle signal which is impressed upon the plates of tube 38 of the filter. Thus the meter 41 gives a maximum reading, showing the relative magnitudes of the helium beam, and hence the leak being sought.

The 120 cycle signal is also applied to the plate of the tube 56 of filter 31, while the grids of this tube, as previously indicated, are fed with a 60 cycle voltage from the power transformer 57. This results in equal average current flow in the two halves of tube 56, as indicated in Fig. 12. Therefore, the D. C. voltages applied to the control grids of tube 60 are equal. With this condition, there is no average current change in the two halves of tube 60 due to the action of common cathode resistor 63. Since, as indicated before, the accelerating electrode 22 of the leak detector is connected in series in a circuit including the D. C. source 67, A. C. sweep source 68, and plate to ground path of one of the discharge devices of tube 60, there will be no average current change in this series circuit as the result of the action of filter 31 upon tube 60 under such conditions, and the operation of the system remains unchanged.

Now if the D. C. accelerating voltage drifts off of the helium peak, that is, the magnitude of the D. C. potential increases to alter the position of the ion beam in the leak detector to such an extent that it does not fully pass through the collector slit and does not produce a maximum current at the collector plate 23, the characteristics may assume the relation indicated by the upper left hand curve $b$ of Fig. 9. The same result may occur if the helium peak itself drifts as the result of such factors as changes in the magnetic field or in the ion source. Under these conditions, the voltage at tube 38 will no longer be predominantly a 120 cycle voltage, but will contain a 60 cycle component whose amplitude is determined by the amount of shift and whose phase is determined by the direction of shift, that is, it may be in phase with or 180 degrees out of phase with the A. C. sweep voltage, depending upon the direction of deviation. This condition may be illustrated by projecting lines from the points $t_1$, $t_2$, $t_3$, etc., of the lower 60 cycle A. C. sweep voltage curve $c$ of Fig. 9 upward until they strike or intersect the non-maximized curve $b$ of Fig. 9 at the upper left hand portion of that figure. Then the lines are projected from these points of intersection of the upper curve $b$ of Fig. 9 horizontally until they intersect the corresponding vertical time markers of Fig. 11. The points of juncture define a curve, the A. C. component of which indicates the characteristic or wave shape of voltage impressed upon tube 29 and filter 30.

With this voltage impressed from the output of tube 29 upon the filter 30, the average currents in the two halves of tube 38 of filter 30 are more nearly equal than would be the case if the helium beam were correctly aligned, and may take the general form indicated in Fig. 15. Thus the indication of meter 41 is reduced.

The opposite situation obtains for filter 31, in that the average current in each half of tube 56 now becomes unequal, one being greater and the other smaller than previously indicated in Fig. 13. The output of filter circuit 31 is impressed upon tube 60, and since the negative D. C. accelerating potential in this example has been assumed to have increased value, it is quite clear that the amplitude and polarity of the D. C. correcting signal applied to the grids of tube 60 have been made such that the D. C. drop across tube 60 is increased, making point 71 more positive with respect to the system ground. This increase in positive voltage compensates, except for the usual residual error signal, for the increase in negative voltage of the D. C. accelerating potential, so that the total accelerating voltage average is again correct for the proper alignment of the helium peak with the collector plate of the detector or spectrometer, and hence the operation of the system remains unchanged.

It will be noted that the synchronous filters or rectifiers 30, and 31 are, in effect, electronic switching devices, but they depart from the ideal during that portion of each cycle when the grid values are swinging between zero and the negative cutoff value. For that small fraction of a cycle both sections of the filters or rectifiers are at some intermediate value of conduction between zero and the maximum. This does not affect the operation of the metering rectifiers or filter 30, but does produce short pulses in the output of rectifier or filter 31, since here the output signal is taken between the anodes and ground. To eliminate these pulses the grid filters comprising resistors 58, 59 and condensers 61, 62 are provided.

In addition to the foregoing, another specific application of the automatic stabilizing system would be the automatic peaking of a tuned circuit utilizing the frequency as the independent variable X and the response as the dependent variable Y, which could control a variable capacitative or inductive element, either mechanical or electronic, by means of this synchronous filter.

Still another application could be the automatic frequency stabilization of a microwave oscillator by incorporating a circuit in which the peak of the standing wave ratio on a measuring line is maintained at a constant position by controlling the oscillator.

While there are also other specific applications which indicate the broad scope of usefulness of this arrangement, it is apparent that many others might be detailed, and for this reason, it is expressly pointed out that the above examples are not to be considered as limiting the scope of the invention, since they are simply representative of some of the categories of its usefulness and application.

Having thus described my invention, I claim:

1. In an automatic stabilizing circuit for a mass spectrometer whose accelerating anode has a D. C. and an A. C. voltage impressed thereon, means for detecting the phase of the signal at the collector plate of said mass spectrometer, and means responsive to the output of said phase detecting means for controlling the accelerating anode D. C. voltage.

2. In an automatic stabilizing circuit for a mass spectrometer, a source of A. C. voltage, means for superimposing said A. C. voltage on the D. C. accelerating anode voltage of said mass spectrometer, a phase detecting circuit, means for impressing the signal at the collector plate of said mass spectrometer onto said phase detecting circuit, a circuit responsive to the output of said phase detecting circuit for producing a D. C. voltage whose deviation from a quiescent voltage is indicative of the phase of the signal at said collector plate, and means for interposing said responsive circuit in the accelerating anode-ground circuit of said mass spectrometer.

3. A stabilizing circuit for a mass spectrometer comprising a source of A. C. potential, a source of D. C. potential, means for superimposing the A. C. potential upon the D. C. accelerating potential of a mass spectrometer, a synchronous filter circuit coupled to the spectrometer, said filter including a pair of electric discharge devices, means for applying a potential of the desired frequency to the control electrodes of said discharge devices in opposite phase relation, and means for extracting a signal corresponding to said desired frequency for controlling the source of D. C. potential.

4. A stabilizing circuit of the character described comprising a mass spectrometer, a source of D. C. accelerating potential, means for superimposing an A. C. potential upon the D. C. accelerating potential, a synchronous filter fed by the spectrometer, said filter including a pair of electric discharge devices having their output circuits coupled to the spectrometer, an additional discharge device coupled to the D. C. source, means for impressing a potential of the desired frequency on the control electrodes of the discharge devices, and means for extracting a signal corresponding to the desired frequency from the output circuits of the discharge devices and for applying it to said additional discharge device to regulate the D. C. source.

5. A stabilizing circuit of the character described comprising a spectrometer, a D. C. source for applying potential to the accelerating electrodes of the spectrometer, means for superimposing an A. C. potential on the D. C. potential from said source, a synchronous filter fed by spectrometer for indicating the peak of the beam to be measured, a second synchronous filter coupled to said spectrometer and responsive to changes in D. C. potential from said source, and means for coupling said second filter to said D. C. source for controlling its operation.

6. A stabilizing circuit of the character described comprising a spectrometer, a D. C. source for said spectrometer, means for superimposing an A. C. voltage of a predetermined frequency on the D. C. potential from the source, a synchronous filter coupled to the spectrometer for indicating the peak of the beam to be measured, a second synchronous filter fed by the spectrometer responsive to displacement of the selected beam from its peak position, said second filter including a pair of electric discharge devices having their output circuits connected in opposition, means for applying a potential of the predetermined frequency to the control electrodes of said discharge devices, a control device coupled to the D. C. source, and means for extracting a signal corresponding to the predetermined frequency and applying it to said control device for regulating the operation of said D. C. source.

ROBERT DE LIBAN.

REFERENCES CITED

The following references are of record in the file of this patent:

UNITED STATES PATENTS

| Number | Name | Date |
|---|---|---|
| 2,428,806 | Liben et al. | Oct. 14, 1947 |
| 2,434,822 | Van Beuren et al. | Jan. 20, 1948 |
| 2,526,509 | Shawhan | Oct. 17, 1950 |